United States Patent
Castellanos et al.

[11] Patent Number: 5,941,337
[45] Date of Patent: Aug. 24, 1999

[54] ANTI-THEFT SEAT BELT

[76] Inventors: Julio Castellanos; Marie-Paule Castellanos, both of 2531 Woodhull Av., Bronx, N.Y. 10469

[21] Appl. No.: 09/116,775

[22] Filed: Jul. 16, 1998

[51] Int. Cl.[6] .............................. B60R 25/00; A41F 1/00
[52] U.S. Cl. .......................... 180/287; 180/270; 24/651; 24/603
[58] Field of Search ..................... 180/270, 287; 307/10.2; 24/651, 633, 200, 198, 603, 165

[56] References Cited

U.S. PATENT DOCUMENTS

| | | | |
|---|---|---|---|
| 3,934,671 | 1/1976 | Hart | 307/10.1 |
| 4,107,645 | 8/1978 | Lewis et al. | 180/287 |
| 4,785,906 | 11/1988 | Kang | 180/270 |
| 5,133,425 | 7/1992 | Han | 180/270 |
| 5,177,837 | 1/1993 | Rekuc | 24/198 |
| 5,335,748 | 8/1994 | Wilson | 180/287 |

*Primary Examiner*—Lanna Mai
*Assistant Examiner*—Jeff Restifo
*Attorney, Agent, or Firm*—Jordan and Hamburg LLP

[57] ABSTRACT

A seat belt arrangement selectively enables vehicle drivability when a buckle member carried on a restraint belt is engaged with a mounted buckle receiving mechanism. The buckle member is removable from the restraint belt, and may be hidden or carried on the person of the user when leaving the vehicle unattended, thereby providing a vehicle anti-theft feature. The detachable buckle plate member is advantageously keyed to the buckle receiving mechanism such that only a particular buckle plate member will operate a correspondingly keyed receiving mechanism with which it is brought into engagement. Such keying may be provided mechanically in the form of a special shape such as employed in the construction of standard keys, or may employ other recognizable identifying factors, such as digitized, audio, optical or other discernable discrete data communicated between the plate and locking members. The buckle receiving mechanism correspondingly enables correct operation of the vehicle in response to recognition of the proper keyed buckle plate member when lockingly engaged therewith.

19 Claims, 3 Drawing Sheets

ANTI-THEFT SEAT BELT

BACKGROUND OF THE INVENTION

The present invention relates to an automobile anti-theft device, and, more particularly, to an automobile anti-theft device incorporated in a seat belt design for preventing operation of the car when the seat belt buckle is disengaged.

In recent years, automobiles have frequently been equipped with various alarms, cutoff switches and tracking devices in an attempt to deter car theft. With the ever increasing cost of new automobiles, the purchase of a car may represent a sizable expenditure. Combined with increasing crime rate in many major cities, the need for such deterrent devices is more important than ever.

Many of the anti-theft devices suggested by the prior art require that the alarm or cutoff system be selectively activated and deactivated by the user, by entering codes and the like, making their use, at times difficult. Accidental triggering of a sound alarm or initiation of engine cutoff by an anti-theft system thought to be correctly disabled by the user is commonplace.

A reliable, yet convenient and simple to operate, automobile anti-theft device would therefore be highly desirable.

SUMMARY OF THE INVENTION

Accordingly, it is an object of the invention to provide an automobile anti-theft device which overcomes the drawbacks of the prior art.

It is a further object of the invention to provide an anti-theft device which provides convenient, reliable and practical means for selectively disabling an engine, or, alternatively activating an alarm system.

In accordance with these and other objects of the invention, there is provided a vehicle anti-theft device, adapted to use in various vehicles, such as for example automobiles, trucks, and the like, in which a modified seat belt buckle includes means for selectively enabling and disabling a theft deterrent system, for example affecting an operative parameter of the automobile, such as for example engine operation, in response to buckling and unbuckling of the seat belt by the driver. For purposes herein, the term "theft deterrent system" includes anything initiating a theft deterrent parameter which varies normal operation of the vehicle, and includes activation of an audible alarm, silent alarm, or diminishing of drivability in any way, including for example, locking of the steering wheel, disabling the ignition or fuel supply, etc. The modified seat belt buckle in accordance with embodiment of the invention includes features common to conventionally employed seat belt buckle mechanisms, including for example cooperative seat belt buckle members comprised of a buckle receiving mechanism mounted to a structurally secure portion of the car interior, and a buckle plate member, carried on a seat belt, and lockingly engagable with the buckle receiving mechanism for securing the vehicle occupant in a seat. In addition thereto, however, the seat belt buckle mechanism as disclosed herein also includes means for removal of the buckle plate member from the seat belt, such that it may be hidden in the automobile or a remote location, or carried by the driver on his person when leaving the vehicle, thereby preventing effective vehicle operation by other than one in possession of the buckle plate member, or activating an alarm when the car is started and the buckle plate member is not engaged with the buckle receiving mechanism.

In accordance with an embodiment of the invention, there is provided a vehicle anti-theft device which includes the modified seat belt mechanism as outlined broadly above, and in which the buckle plate member is directly receivable on the seat belt, the belt itself passing through a receiving slot formed in the buckle plate member, and slidably receivable therein through a slot opening at a peripheral edge of the buckle plate member. Since the buckle plate member may be subject to excessive forces during a collision, a reinforcing structure for preventing deformation of structure defining the slot as a consequence of the cantilever configuration thereof is advantageously provided for structurally bridging and supporting the slot opening.

In an alternative embodiment in accordance with the invention, the buckle plate member of the seat belt buckle actuated vehicle anti-theft device is receivable on compatible receiving structure captively engaged with the seat belt. This feature permits the proper mounting position of the buckle plate member along the seat belt to be readily ascertained simply by locating the receiving structure which remains on the belt when the buckle plate member is removed to impede theft of the vehicle within which it is installed.

In accordance with a further feature of the invention, the detachable buckle plate member is keyed to the buckle receiving mechanism such that only a particular buckle plate member will operate a correspondingly keyed receiving mechanism with which it is brought into engagement. Such feature provides further protection against theft by preventing engagement of a buckle plate member of uniform construction with the buckle receiving mechanism of a vehicle utilizing the same buckle system, and deters activation of the means for selectively enabling and disabling the operative parameter of the vehicle by other than engagement of the particular buckle plate member unique to the individual vehicle. To provide such keying, the buckle plate member may include structure presenting a unique shape, such as the many configurations employed in the construction of standard keys. For example, a series of teeth or notches may be provided, disposed to run along an edge of the plate member in accordance with a specified, discrete pattern. In the alternative, the system may employ other recognizable identifying factors, such as digitized, audio, optical or other discernable discrete data communicated between the plate member and receiving mechanism. Corresponding means are provided in the buckle receiving mechanism for deactivating the theft deterrent system, thereby enabling correct operation of the vehicle or disablement of an alarm system in response to recognition of the proper keyed buckle plate member when lockingly engaged therewith.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
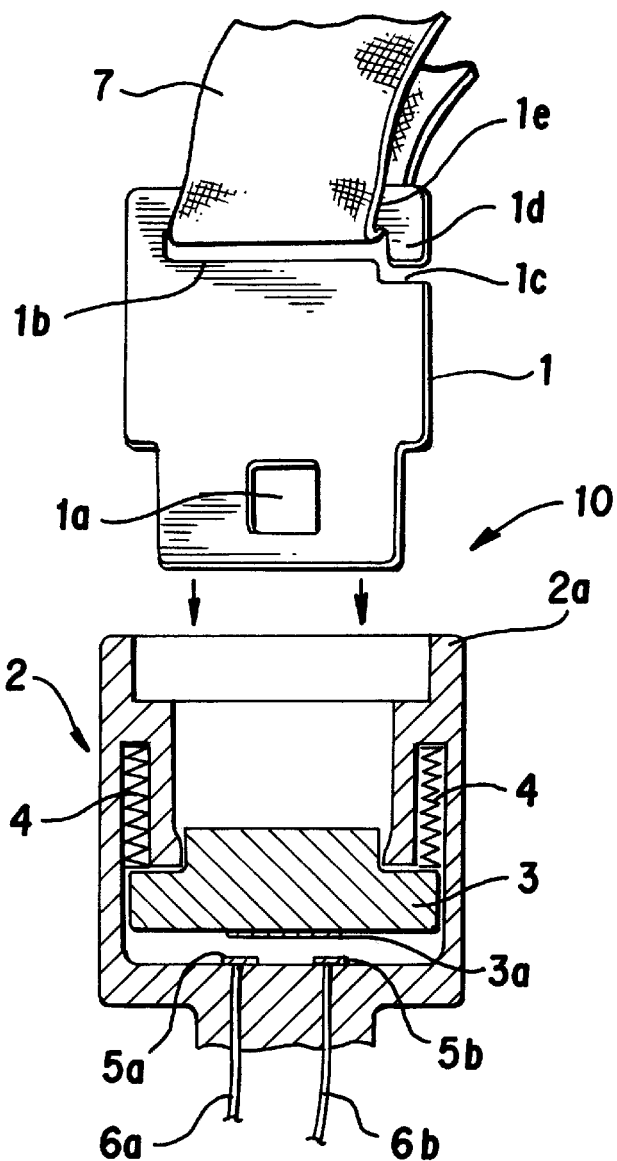
FIG. 1 is a simplified front view in partial cross-section of a buckle plate member and buckle receiving mechanism in accordance with an embodiment of the invention illustrating a mechanism for selectively enabling and disabling effective vehicle operation and/or triggering an alarm.

Referring now to FIG. 1, an embodiment of the seat belt implemented vehicle anti-theft device in accordance with the invention is shown, generally designated 10. Anti-theft device 10 includes a buckle plate member 1 suitably configured to permit locking engagement with a buckle receiving mechanism 2. Buckle receiving mechanism 2 includes an outer housing 2a in which operational components thereof are conveniently housed. Buckle receiving mechanism 2 is securely anchored to a support structure in a vehicle, in accordance with accepted practices and safety guidelines. For purposes herein, reference to the precise nature of the operational portion of buckle receiving mechanism 2 which provides the primary function of locking engagement for purposes of passenger restraint in the event of a collision, and its depiction, has been omitted, inasmuch as the invention is directed to ancillary means for deterring theft of the vehicle in which it is installed. It will be understood that any of the conventional means currently employed in standard car seat belt mechanisms may be utilized in any of the embodiments contemplated herein for providing adequate means for locking engagement and disengagement between buckle plate member 1 and buckle receiving mechanism 2. For example, buckle plate member 1 may include a hole 1a formed therein for purposes of engaging a cooperating manually disengagable locking member (not shown) in buckle receiving mechanism 2 when slidably inserted therein in the direction of the arrows, as shown in FIG. 1. In accordance with embodiment of the invention, circuit activation means responsive to engagement of buckle plate member 1 with buckle receiving mechanism 2 are provided in buckle receiving mechanism 2, conveniently for example in the form of a normally open-biased switch mechanism comprised of a slidable switch member 3 on which is carried a conductive contact 3a, and a pair of contacts 5a and 5b. Means for biasing slidable switch member 3 in an open position is provided, conveniently in the form of laterally disposed springs 4 each mounted at one end to housing 2a of buckle receiving member 2. Contacts 5a and 5b are positioned to contact, and be conductively bridged by, contact 3a when slidable switch member 3 is urged downward against the biasing of springs 4 initiated by insertion of buckle plate member 1 into buckle receiving mechanism 2. A pair of leads 6a and 6b provide means for electrically connecting contacts 5a and 5b, respectively, to a suitable circuit (not shown) for execution of a desired theft deterrent system, such as for example disablement of an automobile ignition or activation of an alarm. Therefore, proper and effective, unimpeded operation of a vehicle equipped with such anti-theft feature is predicated upon engaged coupling of buckle plate member 1 with buckle receiving mechanism 2. Buckle plate member 1 is carried on a driver/passenger restraint security belt 7, slidably received in a slot 1b through a side opening 1c in buckle plate member 1. Side opening 1c is offset from slot 1b, creating a blocking structure 1d at an end of a belt support portion 1e of buckle plate member 1, thereby permitting intentional user-initiated detachment of buckle plate member 1 from security belt 7, yet inhibiting its accidental separation from same during normal operation of the vehicle. The desired anti-theft objectives of the invention are achieved by removal of buckle plate member 1 by the operator of the vehicle when same is left unattended.

In accordance with the embodiment depicted in FIG. 1, the structural integrity of belt support portion 1e relative a remainder of buckle plate member 1 is limited to cantilever support thereof. Therefore, in consideration of the forces generated during a collision, the various dimensional and material characteristics of buckle plate member 1, and particularly belt support portion 1e, including for example overall thickness of buckle plate member 1 and width of belt support portion 1e in light of material strength, will be of desirable design parameters to provide adequate protection against deformation of buckle plate member 1 during vehicle impact.

Figure 2:
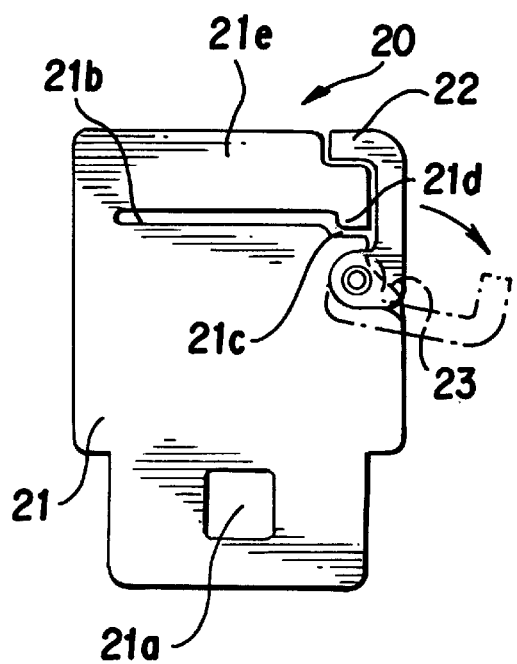
FIG. 2 is a front view of a buckle plate member in accordance with an embodiment of the invention in which the buckle plate member is directly receivable on a seat belt and which includes a reinforcing bridge structure.

When so desired, secondary reinforcement of such cantilever structure against deformation may be optionally provided, as shown for example in the embodiment depicted in FIG. 2, and in which a modified buckle plate member is designated generally as 20. Buckle plate member 20 includes a plate body 21 configured analogously to buckle plate member 1 in the preceding embodiment depicted in FIG. 1 to include a locking engagement hole 21a, a belt reception slot 21b, a offset side opening 21c, a blocking structure 21d and a belt support portion 21e, each which serve an equivalent functional purpose. Buckle plate member 20, for convenience of illustration, is configured for reception in buckle receiving mechanism 2 of the previously described embodiment, the redundant depiction of which has therefore been omitted from FIG. 2. Means for secondary reinforcement against stress-induced deformation of belt support portion 21e accomplished by a structural bridging of side opening 21c is conveniently provided in the form of a reinforcement member 22 mounted to plate body 21 in a manner permitting pivotable movement between a closed position as shown, and an open position shown by phantom line representation. Biasing of reinforcement member 22 in a normally closed position is advantageously provided, conveniently in the form of a spring 23. Other means for maintaining a position of reinforcing member 22 in which it structurally bridges side opening 21c may be provided, such as for example a suitable latching mechanism (not shown).

Figure 3A:
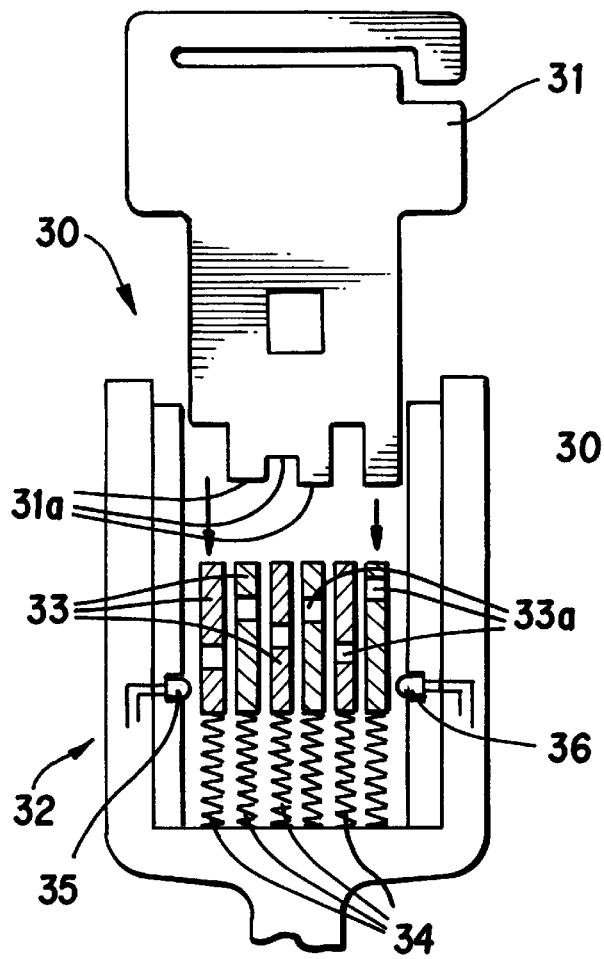
FIG. 3a is a simplified front view in partial cross-section of a seat belt buckle plate member and receiving mechanism combination comprising a vehicle anti-theft device in accordance with an embodiment of the invention utilizing optical keying, shown with the buckle plate member disengaged.
Figure 3B:
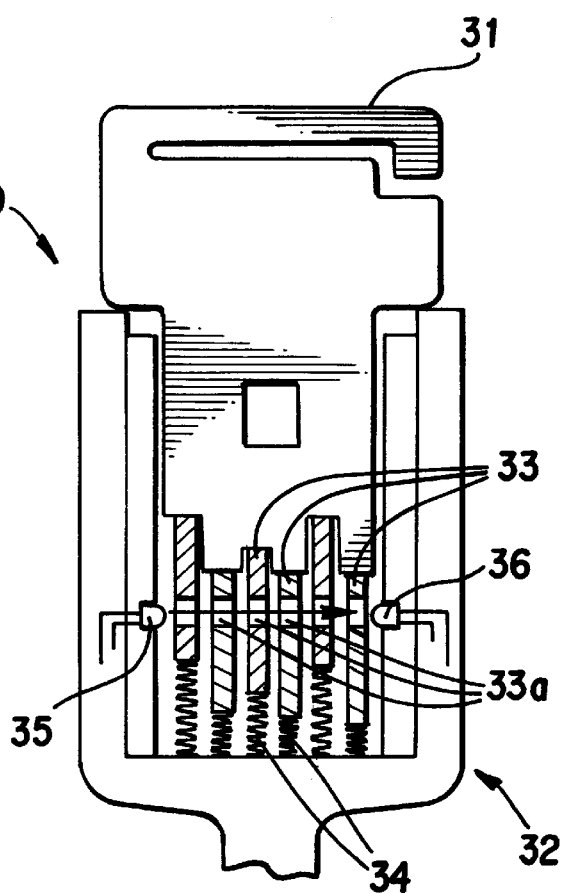
FIG. 3b is a simplified front view in partial cross-section of the device depicted in FIG. 3a, shown with buckle plate engaged with the buckle receiving mechanism for operational enablement of the vehicle within which it is installed.

Although absent from the previously described embodiments, and not essential to practice of the invention, advantageous embodiment of the vehicle anti-theft device in accordance with the invention includes means for keyed recognition of a particular buckle member when engaged with a matched receiving mechanism, thereby deterring unauthorized circumventing of the protective features of the invention by insertion of objects other than the dedicated buckle member into the receiving member. Turning now to FIGS. 3a and 3b, an embodiment of the vehicle anti-theft device in accordance with the invention is shown, generally designated 30, which provides an example of such key initiated operation. Vehicle anti-theft device 30 includes a buckle plate member 31 and a buckle receiving mechanism 32, both configured in general accordance with either of the preceding embodiments, and each additionally structured to provide mutually cooperative keying elements. The keying means in the illustrated embodiment is conveniently provided, for example, in the form of an optically activated switch mechanism. Buckle receiving mechanism 32 includes a series of partition members 33 captively slidable within buckle receiving mechanism 32 and biased in direction opposing a buckle insertion direction, conveniently by means of springs 34. Each partition member 33 includes an aperture 33a formed therein in the direction of the cross-sectional axis of buckle receiving member 32, and at a longitudinal position therealong unique to the particular member 33. Light emitting means are provided on one side of the interior of buckle receiving mechanism 32, and light receiving means at the other side thereof, conveniently in the form of an LED 35 and a phototransistor 36, respectively. In the normally biased state prior to insertion into, and subsequent received engagement of buckle plate member 31 with, buckle receiving mechanism 32, as shown in FIG. 3a, at least one, and advantageously most or all, of partition members 33 block the passage of light emitted by LED 35 across buckle receiving mechanism 32, thereby preventing reception of same by phototransistor 36. It will be understood that phototransistor 36 is an active circuit element of a suitable circuit, for example of conventional design (not shown), which operates to selectively enable proper vehicle operation (or deactivate an alarm) when light is received thereby from LED 35.

Buckle plate member 31 includes a series of teeth 31a correspondingly configured and positioned to engage partition members 33 when inserted into buckle receiving mechanism 32. When buckle plate member 31 is engaged with buckle receiving mechanism 32, as shown in FIG. 3b, teeth 31a of buckle plate member 31 urge partition members 33 against springs 34 an amount determined by the relative extension of each of teeth 31a from a remainder of buckle plate member 31, resulting in alignment of apertures 33a which collectively form a light passage from LED 35 to phototransistor 36. Reception of light emitted by LED 35 by phototransistor 36 in turn enables proper vehicle operation.

Figure 4:
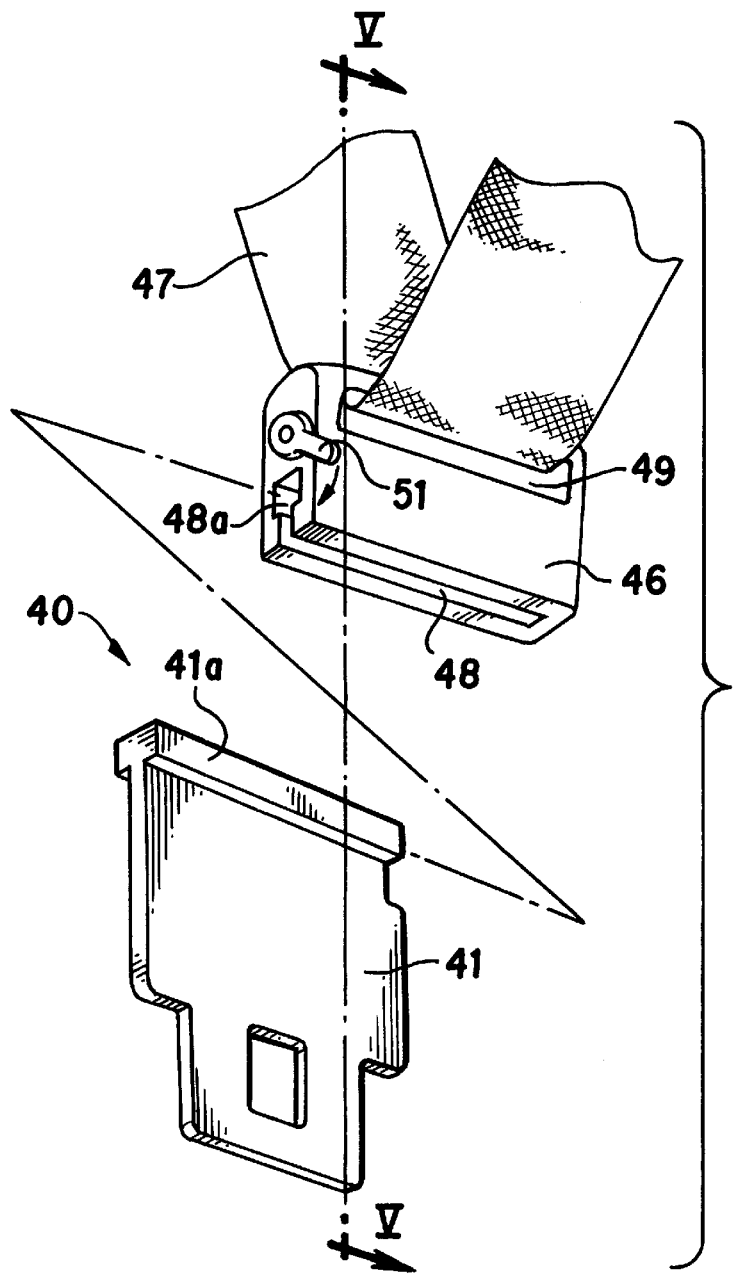
FIG. 4 is a perspective view of a buckle plate member removably engagable with a securement member captively mounted to the seat belt in accordance with an further embodiment of the invention.
Figure 5:
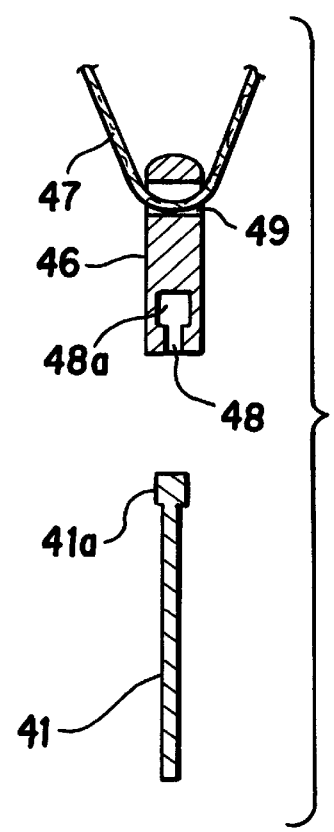
FIG. 5 is a cross-sectional view taken of line V—V of FIG. 4.

In each of the preceding embodiments, the buckle plate member is directly carried on the restraint belt. Alternatively, however, structure may be provided which remains on the restraint belt and to which the buckle plate member is securely engagable, thereby facilitating location by the user of the proper mounting position of the buckle plate member along the seat belt simply by locating the receiving structure which remains on the belt when the buckle plate member is removed by the user. Turning now to FIGS. 4 and 5, a vehicle anti-theft device embodiment utilizing such an approach is depicted, generally designated 40. It is noted vehicle anti-theft device 40 includes a buckle receiving mechanism in accordance with that described with reference to FIG. 1, but which has been omitted from FIGS. 4 and 5 to avoid unnecessary redundancy. Vehicle anti-theft device 40 includes a buckle plate member 41, which for purposes of simplifying disclosure does not have keying, but which can be optionally so equipped if desired, for example, in a manner analogous to any of the approaches suggested with regard to the preceding embodiment. A securement member 46 is provided, and which is captively carried on a restraint security belt 47 which slidably passes through an accommodation slot 49 formed in securement member 46. Means for secured reception of buckle plate member 41 to securement member 46 is provided, conveniently for example as cooperating structure carried on each of the elements. In the illustrated example, such cooperating structure advantageously takes the form of a receiving slot 48 formed in securement member 46 in which a peripheral portion of buckle plate member 41 is slidably receivable. Receiving slot 48 includes a widened region 48a correspondingly configured to receive a widened portion 41a formed peripherally of buckle plate member 41, such that attachment and separation of buckle plate member 41 and securement member 46 requires lateral sliding relative one another. To prevent unwanted separation of buckle plate member 41 from securement member 46, means are provided for selectively blocking lateral sliding of buckle plate member 41, conveniently for example in the form of a pivotable blocking member 51, biased to normally block the side entrance of receiving slot 48 (depicted as urged against such biasing and in an unblocked state, thereby permitting slidable removal of buckle plate member 41 from securement member 46).

It is noted that continuous engagement of the buckle member with the buckle receiving member may not be desirable in all applications, since any disengagement during driving may create a potential safety hazard by unexpected impediment of drivability. Therefore, advantageously, the anti-theft device in accordance with the invention provides for disengagement of the theft deterrent system when the buckle plate member and buckle receiving mechanism are mutually engaged prior to starting the engine, but is effectively disabled as long as the key remains in the ignition after starting.

It is further noted that although referred to as a buckle plate member, such term is intended to apply to other structures not necessarily of flattened configuration, as illustrated for convenience and in accordance with current convention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a vehicle seat belt system in which a buckle plate member carried on a restraint belt is engagable with a mounted buckle receiving mechanism to serve as a connecting bridge between the restraint belt and the buckle receiving mechanism when engagement of the buckle plate member with the buckle receiving mechanism is effected, a feature deterring theft of the vehicle, comprising:

a switch disposed in the buckle receiving mechanism responsive to engagement of the buckle plate member with the buckle receiving mechanism;

means for alternate activation and deactivation of a theft deterrent parameter in response to a position of said switch; and mounting of the buckle plate member permitting user initiated removal of same from the restraint belt for separation of the buckle plate member from both the restraint belt and the buckle receiving mechanism such that the buckle plate member is placed in a detached state in which it is simultaneously free of both the restraint belt and the buckle plate member thereby permitting its relocation in a manner inhibiting access to same by an unauthorized user.

2. A vehicle anti-theft device, comprising:

a restraint belt;

a buckle receiving mechanism mounted to the vehicle;

a buckle plate member carried on said restraint belt and detachably engagable with said buckle receiving mechanism, said buckle plate member serving as bridging structure for holding the restraint belt to the buckle receiving mechanism when captively held to both said restraint belt and said buckle receiving mechanism;

a switch disposed in the said buckle receiving mechanism responsive to engagement of said buckle plate member therewith;

means for alternate activation and deactivation of a theft deterrent parameter in response to a position of said switch; and said buckle plate member including mounting structure permitting user initiated removal of same from said restraint belt thereby permitting separation of said buckle plate member from both said restraint belt and said buckle receiving mechanism such that the buckle plate member is placed in a detached state in which it is simultaneously free of both the restraint belt and the buckle receiving mechanism thereby permitting relocation of said buckle plate member in a manner inhibiting access to same by an unauthorized user.

3. The vehicle anti-theft device according to claim 2, wherein said mounting structure defines a slot which extends to a side opening in said buckle plate member through which said restraint belt is receivable.

4. The vehicle anti-theft device according to claim 3, wherein said side opening is offset from a remainder of said slot, creating a blocking structure at an end thereof, thereby permitting intentional user-initiated detachment of said buckle plate member from said restraint belt, yet inhibiting accidental separation from same during normal operation of the vehicle.

5. The vehicle anti-theft device according to claim 3, further comprising means for structurally bridging said side opening to provide reinforcement against potential deformation during a collision.

6. The vehicle anti-theft device according to claim 5, wherein said means for structurally bridging said side opening includes a reinforcement member mounted to said buckle plate member in a manner permitting pivotable movement between a closed position in which it bridges said side opening, and an open position in which it is clear of said side opening.

7. A vehicle anti-theft device, comprising:

a restraint belt;

a buckle plate member;

a buckle receiving mechanism mounted to the vehicle and engagable with said buckle plate member;

switch means disposed in the said buckle receiving mechanism responsive to engagement of said buckle plate member with said buckle receiving mechanism;

means for alternate activation and deactivation of a theft deterrent parameter in response to a position of said switch means;

means for mounting said buckle plate member on said restraint belt to permit user initiated removal of same from said restraint belt; and keying means for keyed recognition of said buckle plate member when engaged with said buckle receiving mechanism.

8. The vehicle anti-theft device according to claim 2, further comprising:

a securement member captively mounted to said restraint belt; and means for removably securing said buckle plate member to said securement member.

9. A feature according to claim 1, wherein:

said activation of said theft deterrent parameter includes priming an alarm to a ready state upon said disengagement of the buckle plate member from the buckle receiving mechanism, and activating said alarm while in said ready state upon an attempted starting of an ignition of the vehicle without prior re-engagement of the buckle plate member with the buckle receiving mechanism; and said deactivation of said theft deterrent parameter includes disabling said ready state of said alarm in response to re-engagement of the buckle plate member with the buckle receiving mechanism.

10. A feature according to claim 1, wherein said theft deterrent parameter includes a diminishment of drivability of the vehicle while the buckle plate member remains disengaged from the buckle receiving mechanism.

11. A feature according to claim 1, further comprising keying means for keyed recognition of the buckle plate member when engaged with the buckle receiving mechanism.

12. A feature according to claim 1, further comprising means for disabling the theft deterrent parameter in response to a start-up of the vehicle irrespective of said position of said switch.

13. The vehicle anti-theft device according to claim 2, further comprising means for disabling the theft deterrent parameter in response to a start-up of the vehicle irrespective of said position of said switch means.

14. The vehicle anti-theft device according to claim 2, wherein:

said activation of said theft deterrent parameter includes priming an alarm to a ready state upon said disengagement of the buckle plate member from the buckle receiving mechanism, and activating said alarm while in said ready state upon an attempted starting of an ignition of the vehicle without prior re-engagement of the buckle plate member with the buckle receiving mechanism; and said deactivation of said theft deterrent parameter includes disabling said ready state of said alarm in response to re-engagement of the buckle plate member with the buckle receiving mechanism.

15. A method of deterring unauthorized operation of a vehicle equipped with a seat belt restraint system in which a buckle, carried on a belt portion of the seat belt restraint system, is selectively engagable and disengagable with a cooperative member mounted to a fixed portion of the vehicle, the method comprising the steps of:

initiating a theft deterrent parameter in response to disengagement of the buckle from the cooperative member;

maintaining said theft deterrent parameter while the buckle remains disengaged from the cooperative member;

separating the buckle from the belt portion;

locating the buckle in a manner inhibiting access to same by an unauthorized user; and disabling said theft deterrent parameter upon re-engagement of the buckle with the cooperative member.

16. A method according to claim 15, wherein said theft deterrent parameter includes priming an alarm upon said disengagement of the buckle from the cooperative member, and activating said alarm upon an attempted starting of an ignition of the vehicle without prior re-engagement of the buckle with the cooperative member.

17. A method according to claim 15, wherein said theft deterrent parameter includes a diminishment of drivability of the vehicle while the buckle remains disengaged from the cooperative member.

18. A method according to claim 15, further comprising disabling the theft deterrent parameter subsequent to a start-up of the vehicle and on a condition that the vehicle continues to be operative irrespective of continued engagement of the buckle with the cooperative member.

19. A method according to claim 15, wherein the buckle is of portable configuration, and said step of locating includes carrying the buckle on a person of an authorized occupant of the vehicle when same is not being operated.

* * * * *